United States Patent Office

2,700,610
Patented Jan. 25, 1955

2,700,610

PHOTOTHERMOGRAPHIC COMPOSITION

Lawrence Suchow, Long Branch, and Seymour L. Hersh, Freehold, N. J., assignors to the United States of America as represented by the Secretary of the Army No Drawing. Application November 4, 1952,
Serial No. 318,763

8 Claims. (Cl. 95—7)

(Granted under Title 35, U. S. Code (1952), sec. 266)

The invention described herein may be manufactured and used by or for the Government for governmental purposes without the payment of any royalty thereon.

This invention relates to a new photothermographic composition and to methods of producing the same.

Photothermographic material, that is, material of the type which, after it is exposed to light, may be decomposed or modified by the action of heat differentially in accordance with the exposure is described in U. S. Patent 1,976,302 by S. E. Sheppard and W. Vanselow. When exposed to light, the sensitive photothermographic material is affected and nuclei are formed which catalyze its thermal decomposition; subsequent exposure to heat produces a visible image.

It has been known that silver oxalate and also mercurous oxalate are photothermographic substances having the properties above described and that they may be used for the manufacture of photographic layers employing various carriers as for instance gelatine, lacquers from high polymers, and the like.

The present invention is based on the discovery that a coprecipitated mixture of silver and mercurous oxalates exhibits surprisingly higher photothermal sensitivity than do the separate components. This unexpected increase is probably due to local catalytic thermal decomposition of silver oxalate on mercury centers formed by photolysis and in the first stages of the thermal process, in addition to the characteristic photothermal decomposition occurring in each single oxalate. The presence of potassium oxalate increases still further the rate of photolysis of the coprecipitated mixture of silver and mercurous oxalates.

The invention will become more apparent from the following description of specific embodiments of the broad inventive idea:

Taking the case of a coprecipitated mixture of about equimolar quantities of silver and mercurous oxalates as an example, an intimate mixture of oxalates is prepared by the rapid addition of a mixture of 10 ml. of an aqueous solution of about 0.30 N silver nitrate ($AgNO_3$) to 10 ml. of an aqueous solution of about 0.30 N of mercurous nitrate ($HgNO_3$). The mercurous nitrate solution contains about 7 per cent of concentrated nitric acid ($HNO_3$). The resulting solution is added to 20 ml. of an aqueous solution of about 0.36 N potassium oxalate ($K_2C_2O_4$); a precipitate is formed immediately. The reactions may be carried out at room temperatures but lower or higher than room temperatures may also be used.

The precipitate thus obtained is filtered, washed with distilled water and then dispersed in a gelatine sol as follows:

3 grams of Kodak No. 1099 ash free gelatine are dissolved in 20 ml. of distilled water at about 40° C., the precipitate and also additional oxalate (about 4.2 ml. of a .36 N solution of potassium oxalate) are added, the mixture increased in volume with distilled water to about 60 ml., and then stirred vigorously for at least one hour while keeping the emulsion at approximately 40° C.

While stirring the above described emulsion, about 0.8 ml. thereof are removed with a medicine dropper and applied to the surface of a clean glass slide 2¼" x 1". Drying was accomplished on a level aluminum block at 80° C. The emulsion thus heated was found to be more sensitive than one dried at room temperature, and approximately the same as if it were dried at room temperature and then heated at 80° C. for about 2 minutes. The plates were exposed to an ultraviolet source, and thermal development was carried out by placing the plate emulsion-side up for one minute in a Nichrome-wound aluminum block oven at 120° C.

Coprecipitated mixtures of silver and mercurous oxalates containing approximately 50–60 mole percent of the latter exhibit very much higher photothermal sensitivity than do the separate components.

Physical mixtures of the silver and mercurous oxalates, as opposed to coprecipitated mixtures, exhibit photothermal sensitivities intermediate between those of the individual oxalates.

It has been found that the products of coprecipitation of silver and mercurous oxalates have a yellowish cast, whereas either oxalate alone or a physical mixture of the two is perfectly white. However, all indications are that there is no relation between yellowing and either the spectral or the overall sensitivity.

The high sensitivity of the coprecipitated silver and mercurous oxalates can be explained by a catalytic mechanism. J. Y. MacDonald, J. Chem. Soc., 1936, 832–8 has reported that metallic mercury has a strong catalytic effect upon the thermal decomposition of silver oxalate. If, therefore, mercury nuclei are first formed from the sensitive $Hg_2C_2O_4$ by photolysis and in the first stages of the thermal process, these nuclei could act as catalytic centers for decomposition of the silver oxalate. The mercurous oxalate would, of course, also simultaneously decompose further upon continued heating. In addition, the silver oxalate would concurrently undergo its characteristic photothermal decomposition. The fact that an emulsion containing a physical mixture is only intermediate in sensitivity between those of either oxalate alone indicates that a very intimate mixture of the oxalates is required to provide conditions under which the mercury nuclei formed will be in sufficiently close contact with the silver oxalate to have an effect upon its thermal decomposition rate. Since such close intimacy is required, decomposition does not spread to unexposed areas.

In order to test directly the effect of mercury upon a silver oxalate emulsion, the metal was stirred into an emulsion for various lengths of time. After short periods, no effect was noted in the emulsion, but after 45 minutes, the emulsion had turned brown, indicating decomposition. Upon thermal development of unexposed plates coated with emulsions stirred with mercury for different periods of time, it was found that darkening occurred in all cases, the photographic density being constant regardless of the period of contact with mercury or of the color before development. This indicates that little mercury is required for catalysis of the thermal decomposition of $Ag_2C_2O_4$ at 120° C.

Further evidence for the catalytic mechanism proposed was provided by experiments with coprecipitated mixtures of silver and mercuric oxalates, with approximately a 1:1 atomic ratio of Ag:Hg. Since mercuric oxalate is much less photothermally sensitive than mercurous oxalate, the decomposition rates of its coprecipitated mixtures with silver oxalate were found to be much lower than those of silver and mercurous oxalates. However, the fact that the photothermal sensitivity of the silver and mercuric oxalate mixture was found to be much higher than that of either of its components alone adds further support to the catalytic mechanism advanced. The color of the coprecipitated mixture of silver and mercuric oxalates is white.

It has been found that excess oxalates (such as potassium oxalate) greatly increase the photothermal sensitivity of the coprecipitated mixture of silver and mercurous oxalate made according to the present invention. It has particularly been found that good results are obtained by a 25 per cent excess of potassium oxalate.

It is apparent for those skilled in the art that various carriers may be used to make a photographic layer with the use of the photothermographic substances according to the invention and various changes and modifications are feasible without departing from the inventive idea as defined in the following claims.

What is claimed is:

1. A method of making a photothermographic composition comprising coprecipitating silver oxalate and mercury oxalates from a mixture of a solution of silver nitrate and mercury nitrates in the presence of nitric acid by adding to said mixture a solution of potassium oxalate.

2. A method of making a photothermographic composition according to claim 1 in which the mercury oxalate consists of mercurous oxalate.

3. A method of making a photothermographic composition according to claim 1 in which the mercury oxalate consists of mercuric oxalate.

4. A method of making a photothermographic composition according to claim 1 in which the reaction is carried out at room temperature.

5. A method of making a photothermographic composition comprising mixing 1 mole of an aqueous solution of about 0.30 N silver nitrate with 1 mole of an aqueous solution of about 0.30 N of mercurous nitrate, said mercurous nitrate containing about 7 per cent of concentrated nitric acid, adding about 2 moles of an aqueous solution of about 0.36 N potassium oxalate and separating the resulting precipitate of silver and mercurous oxalates by filtration and washing the filtrate with distilled water.

6. A photothermographic element comprising a colloid carrier and a light sensitive material therein, said light sensitive material consisting of a coprecipitated mixture of silver and mercury oxalates.

7. A photothermographic element comprising a colloid carrier and a light sensitive material therein, said light sensitive material consisting of a coprecipitated mixture of silver and mercurous oxalates.

8. A photothermographic element comprising a colloid carrier and a light sensitive material therein, said light sensitive material consisting of a coprecipitated mixture of silver and mercuric oxalates.

References Cited in the file of this patent

UNITED STATES PATENTS

| | | |
|---|---|---|
| 1,976,302 | Sheppard et al. | Oct. 9, 1934 |

FOREIGN PATENTS

| | | |
|---|---|---|
| 616,318 | Great Britain | Jan. 19, 1949 |